United States Patent
Scheurich et al.

(10) Patent No.: US 10,556,479 B2
(45) Date of Patent: Feb. 11, 2020

(54) GYROSCOPE-BASED ROTATION DAMPER FOR A MOTOR VEHICLE

(71) Applicants: AUDI AG, Ingolstadt (DE);
Karlsruher Institute für Technologie, Karlsruhe (DE)

(72) Inventors: Bastian Scheurich, Bad Wimpfen (DE); Tilo Koch, Ingolstadt (DE); Frank Gauterin, Leinsweiler (DE); Michael Frey, Ettlingen (DE)

(73) Assignees: AUDI AG, Ingolstadt (DE);
Karlsruher Institut für Technologie, Karlsruhe (DE)

( * ) Notice: Subject to any disclaimer, the term of this patent is extended or adjusted under 35 U.S.C. 154(b) by 277 days.

(21) Appl. No.: 15/544,085

(22) PCT Filed: Dec. 12, 2015

(86) PCT No.: PCT/EP2015/002500
§ 371 (c)(1),
(2) Date: Jul. 17, 2017

(87) PCT Pub. No.: WO2016/112942
PCT Pub. Date: Jul. 21, 2016

(65) Prior Publication Data
US 2018/0009286 A1   Jan. 11, 2018

(30) Foreign Application Priority Data

Jan. 17, 2015 (DE) .................. 10 2015 000 566

(51) Int. Cl.
*B60G 21/08* (2006.01)
*F16F 15/02* (2006.01)

(52) U.S. Cl.
CPC .............. *B60G 21/08* (2013.01); *F16F 15/02* (2013.01); *B60G 2202/22* (2013.01);
(Continued)

(58) Field of Classification Search
CPC ..................................................... B60G 21/08
See application file for complete search history.

(56) References Cited

U.S. PATENT DOCUMENTS

| 3,250,137 A * | 5/1966 | Delsuc | B60G 17/01908 |
| | | | 74/5.6 R |
| 3,711,113 A * | 1/1973 | Stammreich | B60G 3/26 |
| | | | 280/5.51 |

(Continued)

FOREIGN PATENT DOCUMENTS

| DE | 102013015702 B3 | 12/2014 |
| EP | 0650890 A1 | 5/1995 |

OTHER PUBLICATIONS

Communication pursuant to Article 94(3) EPC dated Apr. 1, 2019 in corresponding European patent application No. 15 813 690.3 including partial machine-generated English language translation; 7 pages.

(Continued)

*Primary Examiner* — Terence Boes
(74) *Attorney, Agent, or Firm* — Maier & Maier, PLLC

(57) ABSTRACT

A gyroscope-based rotation damper for a motor vehicle, includes a flywheel that is driven via a drive, rotates around an axis of rotation at an angular velocity ($\omega_\varphi$), the flywheel being mounted in a gimbal on the motor vehicle structure by way of a first bearing element and a second bearing element. The flywheel is mounted rotatably around the angle of rotation ($\varphi$) at the first bearing element, and the first bearing element is rotatably mounted at the second bearing element around a first angle of rotation ($\theta$) around a first axis aligned orthogonal to the axis of rotation of the flywheel, and the second bearing element is mounted rotatably around a second angle of rotation ($\psi$) around a second axis aligned orthogonal to the first axis, as well as a controller unit for controlling a shaft drive.

6 Claims, 1 Drawing Sheet

(52) U.S. Cl.
CPC ...... *B60G 2202/42* (2013.01); *B60G 2401/28* (2013.01); *B60G 2600/14* (2013.01); *B60G 2600/17* (2013.01)

(56) References Cited

U.S. PATENT DOCUMENTS

| | | | |
|---|---|---|---|
| 2008/0234877 A1* | 9/2008 | Kimura ................ | B60G 17/016 701/1 |
| 2016/0144684 A1* | 5/2016 | De Vlugt ................ | B60G 9/00 280/124.106 |
| 2016/0229256 A1* | 8/2016 | Koch ...................... | F16F 15/02 |
| 2018/0264905 A1* | 9/2018 | Kimura .............. | B60G 17/0182 |

OTHER PUBLICATIONS

Examination Report dated Oct. 26, 2015 of corresponding German application No. 10 2015 000 566.9; 9 pgs.
International Search Report and Written Opinion dated Mar. 21, 2016 of corresponding application No. PCT/EP2015/002500; 12 pgs.
Notification of Transmittal of Translation of the International Preliminary Report on Patentability dated Jul. 27, 2017, in connection with corresponding international application No. PCT/EP2015/002500 (6 pgs.).

* cited by examiner

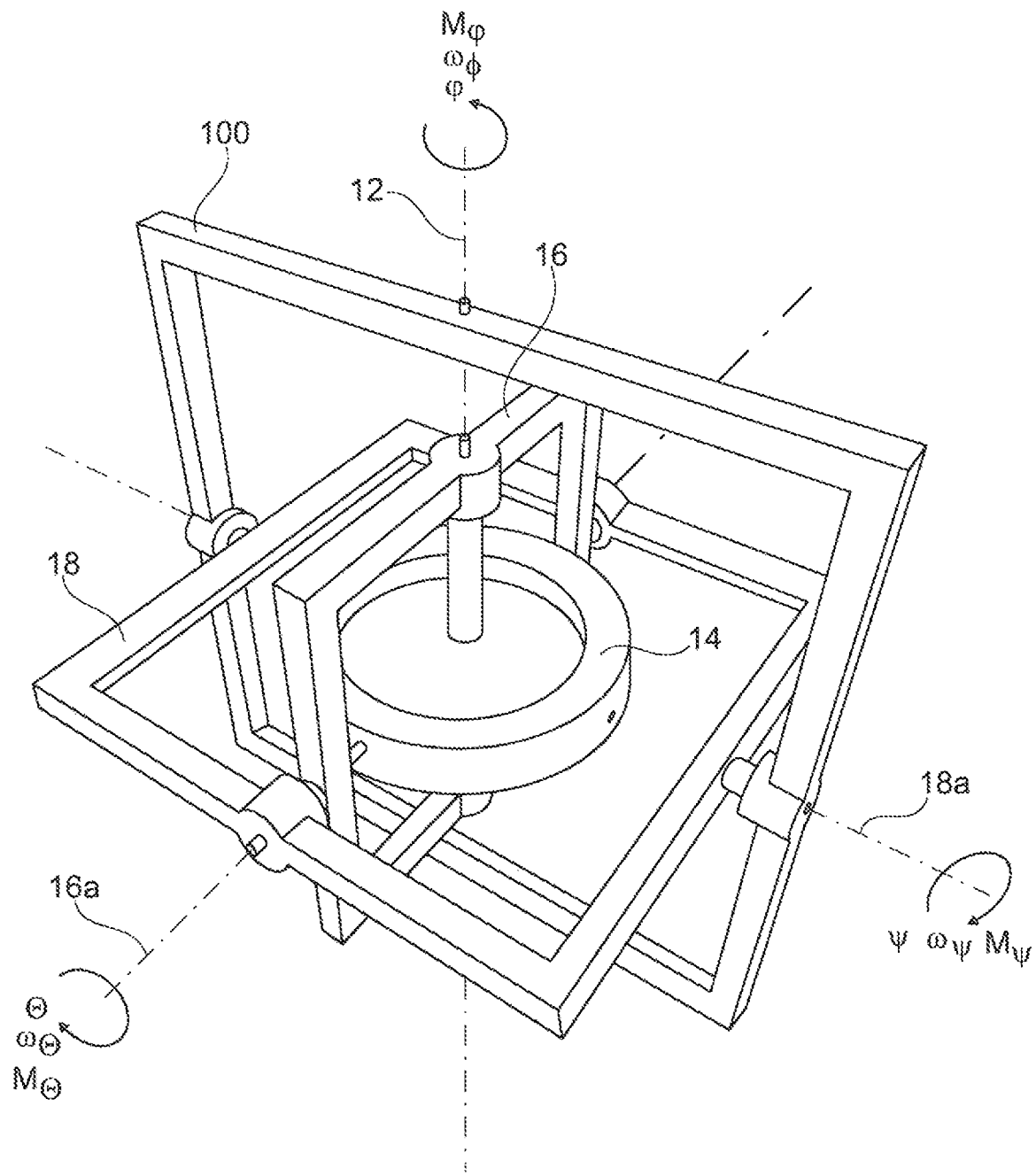

GYROSCOPE-BASED ROTATION DAMPER FOR A MOTOR VEHICLE

FIELD

The invention relates to a gyroscope-based rotation damper for a motor vehicle.

BACKGROUND

Different designs of rotation dampers for vibration damping of the structure of a motor vehicle are known from the prior art. Thus, DE 10 2011 101 350 A1 discloses a rotation damper for a motor vehicle, comprising at least one damper element for damping the relative movement between a first mass disposed on the side of the wheel suspension and a second mass disposed on the side of the vehicle body. In this case, the damper element has at least one rotatable damper part, which can be displaced into a rotational movement by way of a lifting element movable through movement of the mass and mechanically coupled in movement to the damper part, wherein at least one spring damping element is integrated into the mechanical movement coupling between lifting element and rotatable damper part.

SUMMARY OF THE DISCLOSURE

The object of the invention is to provide a gyroscope-based rotation damper for a motor vehicle, in which the damping effect is to be attributed to a gyroscopically acting flywheel mounted in a gimbal on the motor vehicle structure.

The gyroscope-based rotation damper for a motor vehicle according to the invention comprises a flywheel rotating around an axis of rotation at an angular velocity $\omega_\varphi$ and driven via a drive, the flywheel being mounted in a gimbal on the motor vehicle structure by way of a first bearing element and a second bearing element. For this purpose, the flywheel is mounted rotatably around the angle of rotation $\varphi$ at the first bearing element, and the first bearing element is mounted rotatably at the second bearing element around a first angle of rotation $\theta$ around a first axis aligned orthogonal to the axis of rotation of the flywheel, and the second bearing element is mounted rotatably on the motor vehicle structure around a second angle of rotation $\psi$ around a second axis aligned orthogonal to the first axis. In addition, the first bearing element has means by which the first bearing element can be joined to a wheel carrier in such a way that a compression/rebound movement of the wheel carrier brings about a rotation of the first bearing element around the first angle of rotation $\theta$. Also, the gyroscope-based rotation damper comprises a shaft drive that is operatively connected to the second bearing element via a drive shaft and a controller unit for controlling the shaft drive, wherein the controller unit controls the angular velocity $\omega_\psi$ and/or the torque $M_\psi$ of the drive shaft by way of the shaft drive as a function of the first angle of rotation $\theta$ and/or of the torque $M_\theta$.

The configuration of the gyroscope-based rotation damper according to the invention is characterized in that the effect of rotational inertia is used in order to introduce forces into the chassis. These forces can replace and expand the function of a conventional damper element.

A brief explanation of the functional principle is as follows:

In the initial state, the flywheel rotates around its axis of rotation at the angular velocity $\omega_\varphi$. If a torque $M_\theta$ is effective at the first axis of the first bearing element, a torque $M_\varphi$ arises around the second axis due to precession. The torques lead to an angular velocity of the first or the second bearing element. A torque $M_\theta$ consequently leads to an angular velocity $\omega_\theta$ of the first bearing element. This torsion changes the direction of the angular velocity vector $\omega_\varphi$ of the flywheel. The rotating flywheel reacts to such a disruption with the mentioned precession torque $M_\psi$. However, since the angular velocity $\omega_\psi$ also changes the angular velocity vector $\omega_\varphi$ of the flywheel due to the structure, there is a direct effect of all three axes. Introduction of energy into one axis shows a change in the energy of the other two axes.

If the first bearing element is considered as the input, then $M_\theta$ and $\omega_\theta$ are equalized. If this energy can again be withdrawn at the second axis of the second bearing element, $M_\psi$ and $\omega_\psi$ are thereby oriented opposite one another. The inverse case is likewise possible. Equalized amounts of $M_\psi$ and $\omega_\psi$ lead to unequally oriented amounts of $M_\theta$ and $\omega_\theta$. If all of the energy of the torque $M_\psi$ is not withdrawn, then the angular velocity $\psi_\varphi$ of the flywheel will increase due to the feedback effect. The excess energy is stored in the form of kinetic energy in the rotational movement of the flywheel. The ratio of the individual torques in this case is determined by the rotational inertias of the flywheel.

Now, if the first bearing element is joined to a wheel carrier in such a way that a compression/rebound of the wheel carrier causes a torque $M_\theta$ and an angular velocity $\omega_\theta$ of the first bearing element around the first axis, a relative movement of the second bearing element arises around the second axis. If the angular velocity $\omega_\psi$ of the second bearing element introduces a counter-torque $M_\psi$, then the relative movement of the second bearing element around the second axis is damped. This leads in turn to the damping of the angular velocity $\omega_\theta$ of the first bearing element around the first axis. Depending on the magnitude of the counter-torque $M_\psi$ in each case, the damping results as stronger or weaker.

In contrast to this, if a torque $M_\psi$ equalized to the angular velocity $\omega_\psi$ is introduced, this leads to a support of the compression/rebound movement. That is, the gyroscope-based rotation damper can also be used as an actuator in order to actively provide vertical forces at the wheel carrier and thus to take over functions of an active chassis.

Preferably, the drive of the flywheel and/or the shaft drive of the drive shaft is designed as an electric motor. This has the advantage that the possibility of producing power is given in the generator operation, so that under certain circumstances, a feedback of energy into the vehicle network power system is made possible.

According to another advantageous embodiment of the invention, the first bearing element is operatively connected to the wheel carrier in such a way that in the case of a compression/rebound movement of the wheel carrier for the first angle of rotation $\theta$, the condition $-\pi/2 < \theta < +\pi/2$ is always fulfilled.

It is thereby ensured that a torque $M_\theta$ can be maintained for a very long time, so that the system can be used for roll stabilization, raising and lowering of wheels and of the structure, and other conceivable active chassis controls.

Additional advantages, features and application possibilities of the present invention result from the following description in combination with the example of embodiment shown in the drawing.

BRIEF DESCRIPTION OF THE DRAWINGS

In the drawing:

FIG. 1 indicates a schematic representation of a gyroscope-based rotation damper according to the invention.

DETAILED DESCRIPTION

FIG. 1 shows a gyroscope-based rotation damper for a motor vehicle in a schematic representation, which is designated overall by the reference number 10.

The gyroscope-based rotation damper 10 comprises a flywheel 14 that rotates around an axis of rotation 12 at an angular velocity $\omega_\varphi$ and that is mounted in a gimbal by way of a first bearing element 16 and a second bearing element 18.

In this case, the flywheel 14 is mounted rotatably around the angle of rotation $\varphi$ at the first bearing element, and the first bearing element 16 is mounted rotatably at the second bearing element 18 around a first angle of rotation $\theta$ around a first axis 16a aligned orthogonal to the axis of rotation 12 of the flywheel 14, and the second bearing element 18 is mounted rotatably on the motor vehicle structure around a second angle of rotation $\psi$ around a second axis 18a aligned orthogonal to the first axis 16a.

Not shown in the schematic representation according to FIG. 1 is a drive of the flywheel 14, a shaft drive in operative connection to the second bearing element 18 via a drive shaft, as well as the connection of the first bearing element 16 to a wheel carrier. An illustration of the controller device, by which the shaft drive and thus the angular velocity $\omega_\psi$ and/or the torque $M_\psi$ of the drive shaft can be controlled as a function of the first angle of rotation $\theta$ and/or of the first torque $M_\theta$, was also omitted.

The schematically shown gyroscope-based rotation damper 10 uses the effect of rotational inertia in order to introduce forces into the chassis at a suitable place. These forces will replace and expand the function of a conventional damper element.

A brief explanation of the functional principle is as follows:

In the initial state, the flywheel 14 rotates around its axis of rotation 12 at the angular velocity $\omega_\varphi$. If a torque $M_\theta$ is effective at the first axis 16a of the first bearing element 16, a torque $M_\psi$ arises around the second axis 18a due to the precession. The torques lead to an angular velocity $\omega_\theta$ or $\omega_\psi$, respectively, of the first or the second bearing element 16, 18. A torque $M_\theta$ consequently leads to an angular velocity $\omega_\theta$ of the first bearing element 16. This torsion changes the direction of the angular velocity vector $\omega_\varphi$ of the flywheel 14. The rotating flywheel 14 reacts to such a disruption with the mentioned precession torque $M_\psi$. However, since the angular velocity $\omega_\psi$ also changes the angular velocity vector $\omega_\varphi$ of the flywheel 14 due to the structure, there is a direct effect of all three axes. Introduction of energy into one axis shows a change in the energy of the other two axes.

If the first bearing element 16 is considered as the input, then $M_\theta$ and $\omega_\theta$ are equalized. If this energy can again be withdrawn at the second axis 18a of the second bearing element 18, $M_\psi$ and $\omega_\psi$ are thereby oriented opposite one another. The inverse case is likewise possible. Equalized amounts of $M_\psi$ and $\omega_\psi$ lead to unequally oriented amounts of $M_\theta$ and $\omega_\theta$. If all of the energy of the torque $M_\psi$ is not withdrawn, then the angular velocity $\omega_\varphi$ of the flywheel 14 will increase due to the feedback effect. The excess energy is stored in the form of kinetic energy in the rotational movement of the flywheel 14. The ratio of the individual torques in this case is determined by the rotational inertias of the flywheel.

Now, if the first bearing element 16 is joined to the wheel carrier in such a way that a compression/rebound of the wheel carrier causes a torque $M_\theta$ and an angular velocity $\omega_\theta$ of the first bearing element 16 around the first axis 16a, a relative movement of the second bearing element 18 arises around the second axis 18a. If a counter-torque $M_\psi$ is introduced relative to the angular velocity $\omega_\psi$ of the second bearing element via the shaft motor, then the relative movement of the second bearing element 18 around the second axis 18a is damped. This leads in turn to the damping of the angular velocity $\omega_\theta$ of the first bearing element 16 around the first axis 16a. Depending on the magnitude of the counter-torque $M_\psi$, in each case, the damping results as stronger or weaker.

In contrast to this, if a torque $M_\psi$ equalized to the angular velocity $\omega_\psi$ is introduced by the shaft motor, this leads to a support of the compression/rebound movement. That is, the gyroscope-based rotation damper can also be used as an actuator in order to actively provide vertical forces at the wheel carrier and thus to take over functions of an active chassis.

The invention claimed is:

1. A gyroscope-based rotation damper for a motor vehicle, comprising:
a flywheel that is driven via a drive, rotates around an axis of rotation at an angular velocity ($\omega_\varphi$) and that is mounted on the motor vehicle structure via a first bearing element and a second bearing element in a gimbal, wherein the flywheel is mounted rotatably around an angle of rotation ($\varphi$) at the first bearing element, and the first bearing element is rotatably mounted at the second bearing element around a first angle of rotation ($\theta$) around a first axis aligned orthogonal to the axis of rotation of the flywheel, and the second bearing element is mounted rotatably at the motor vehicle structure around a second angle of rotation ($\psi$) around a second axis aligned orthogonal to the first axis; and
a controller unit for controlling a shaft drive,
wherein the second bearing element rotatably mounted on the motor vehicle structure is operatively connected to the shaft drive via a drive shaft, wherein the first bearing element rotatably mounted at the second bearing element is operatively connected to a wheel carrier in such a way that a compression/rebound movement of the wheel carrier causes a rotation of the first bearing element around the first angle of rotation ($\theta$), wherein the controller unit controls the angular velocity ($\omega_\psi$) and the torque ($M_\psi$) of the drive shaft by way of the shaft drive as a function of the first angle of rotation ($\theta$) and of the first torque ($M_\theta$).

2. The gyroscope-based rotation damper according to claim 1, wherein the drive of the flywheel and the shaft drive of the drive shaft is an electric motor.

3. The gyroscope-based rotation damper according to claim 1, wherein the first bearing element is joined to the wheel carrier in such a way that for a compression/rebound movement of the wheel carrier, the following applies for the first angle of rotation ($\theta$): $-\pi/2 < \theta < +\pi/2$.

4. The gyroscope-based rotation damper according to claim 1, wherein the power flow at the drive shaft from the shaft motor is positive or negative.

5. The gyroscope-based rotation damper according to claim 1, wherein the power flow at the axis of rotation from the drive is positive or negative.

6. The gyroscope-based rotation damper according to claim 1, wherein the power flow at the first axis from the connection of the wheel carrier is positive or negative.

\* \* \* \* \*